(12) United States Patent
Imamura et al.

(10) Patent No.: US 8,529,799 B2
(45) Date of Patent: Sep. 10, 2013

(54) MANUFACTURING METHOD OF METAL OXIDE SEMICONDUCTOR MATERIAL FOR GAS SENSOR

(75) Inventors: Tetsuji Imamura, Toyama (JP);
Daisuke Kuwahara, Toyama (JP);
Takayuki Nakano, Toyama (JP);
Takahiro Ishibashi, Toyama (JP)

(73) Assignee: Hokuriku Electric Industry Co., Ltd., Toyama-Shi (JP)

( * ) Notice: Subject to any disclaimer, the term of this patent is extended or adjusted under 35 U.S.C. 154(b) by 320 days.

(21) Appl. No.: 13/060,886

(22) PCT Filed: Aug. 28, 2009

(86) PCT No.: PCT/JP2009/065075
§ 371 (c)(1),
(2), (4) Date: May 12, 2011

(87) PCT Pub. No.: WO2010/024387
PCT Pub. Date: Mar. 4, 2010

(65) Prior Publication Data
US 2012/0112137 A1 May 10, 2012

(30) Foreign Application Priority Data
Aug. 29, 2008 (JP) ................................. 2008-221720

(51) Int. Cl.
*H01B 1/02* (2006.01)
*H01B 1/22* (2006.01)

(52) U.S. Cl.
USPC ................ 252/514; 422/83; 422/98; 436/151

(58) Field of Classification Search
USPC ...................... 252/514; 422/83, 98; 426/151
See application file for complete search history.

(56) References Cited

U.S. PATENT DOCUMENTS
4,839,327 A 6/1989 Haruta et al.

FOREIGN PATENT DOCUMENTS

| JP | 63-252908 | 10/1988 |
|----|-----------|---------|
| JP | 05-087760 | 4/1993 |
| JP | 2000-105210 | 4/2000 |
| JP | 2007-139713 | 6/2007 |
| JP | 2008-064674 | 3/2008 |
| WO | 2010/024387 | 3/2010 |

*Primary Examiner* — Khanh Tuan Nguyen
(74) *Attorney, Agent, or Firm* — Rankin, Hill & Clark LLP (57) ABSTRACT

Provided is a manufacturing method of a metal oxide semiconductor material for gas sensors by which an oxide precursor and noble metal colloid particles will not readily cohere in the manufacturing process. The manufacturing process implements a precursor solution synthesis step 1 of synthesizing an oxide precursor solution in which an oxide precursor is dispersed, a pH adjustment step 3 of adjusting the pH of the oxide precursor solution, a precursor-colloid dispersion preparation step 5 of preparing an oxide precursor-noble metal colloid dispersion in which the oxide precursor and the noble metal colloid are dispersed substantially uniformly, a purifying step 7 of purifying the oxide precursor-noble metal colloid dispersion to obtain a purified oxide precursor noble metal colloid dispersion, and a freeze-drying step 11 of freeze-drying an precipitate of the purified oxide precursor-noble metal colloid dispersion.

22 Claims, 6 Drawing Sheets

Fig.2

| | Alkaline | Purification condition | Chlorine ion | Nitrate ion |
|---|---|---|---|---|
| #1 | TMAH | After adjustment of dispersion | 157ppm | 5571ppm |
| #2 | TMAH | First decantation | 22ppm | 1128ppm |
| #3 | TMAH | Second decantation | 10ppm | 324ppm |
| #4 | TMAH | Third decantation | 3.8ppm | 85ppm |

MANUFACTURING METHOD OF METAL OXIDE SEMICONDUCTOR MATERIAL FOR GAS SENSOR

TECHNICAL FIELD

The present invention relates to a manufacturing method of a metal oxide semiconductor material for gas sensors wherein a change in resistance of the metal oxide semiconductor material is caused by gas absorption.

BACKGROUND ART

Japanese Patent Application Publication No. 5-87760 (Patent Document 1) discloses a method by which a noble metal is mixed in a metal oxide precursor so as to manufacture a metal oxide semiconductor material for gas sensors. In such a metal oxide semiconductor material used for gas sensors, a noble metal colloid obtained by coating particles of a noble metal such as Pt or Pd with a polymer or the like and making them into a colloidal state is used to improve the dispersibility between the metal oxide precursor and the noble metal for the purpose of enhancing the sensor sensitivity of gas sensors. The noble metal colloid contains many impurities which may cause a decrease in the sensor sensitivity, and the impurities are mixed into a dispersion in which the metal oxide precursor and noble metal colloid are mixed and dispersed. Therefore, the dispersion of the metal oxide precursor and noble metal colloid is purified with ion-exchanged water so as to remove the impurities from the dispersion. In this case, the noble metal colloid has a low specific gravity and is thus not precipitated by spontaneous sedimentation. Then, after adding the ion-exchanged water to the dispersion of the metal oxide precursor and noble metal colloid for purifying, a centrifuge is used to forcibly separate the purified dispersion into a supernatant and a precipitate. Then, the supernatant containing impurities is removed to eliminate the impurities from the dispersion. After that, the precipitate remaining after the removal of the supernatant is subjected to drying by heating (or thermal depressurization), and the dried precipitate is subjected to pulverization for subsequent process of achieving uniformity in distribution of particle diameters by using a roll mill.

Patent Document 1: Japanese Patent Application Publication No. 5-87760 (JP05-087760A)

DISCLOSURE OF THE INVENTION

Technical Problem

However, there is a technical problem with the conventional manufacturing method of a metal oxide semiconductor material for gas sensors. Although the metal oxide precursor and noble metal colloid have once been dispersed, the precipitated metal oxide precursor and noble metal colloid particles cohere due to the forcible centrifugal separation during purifying. Further, there is another technical problem in that a precipitate of the dispersion that has been subjected to purifying with water coheres due to heat contraction during heating/drying period. The cohesion of the particles decreases the sensitivity of the sensor, which is unfavorable in manufacturing the metal oxide semiconductor material for gas sensors. Further, at the time when the particles that have cohered due to heating/drying are pulverized, the electrical characteristics vary depending on the degree of pulverization, and merely pulverizing the particles is not enough.

An object of the present invention is to provide a manufacturing method of a metal oxide semiconductor material for gas sensors whereby a metal oxide precursor and noble metal colloid particles will not readily cohere in the manufacturing process.

Another object of the present invention is to provide a manufacturing method of a metal oxide semiconductor material for gas sensors whereby the metal oxide precursor and noble metal colloid are precipitated in a dispersed state without use of a centrifuge.

Still another object of the present invention is to provide a manufacturing method of a metal oxide semiconductor material for gas sensors whereby the precipitates of the metal oxide precursor and noble metal colloid are dried without cohering the particles of the metal oxide precursor and noble metal.

Solution to Problem

The present invention is aimed at improvements of a manufacturing method of a metal oxide semiconductor material for gas sensors wherein a change in resistance of the metal oxide semiconductor material is caused by gas absorption. The manufacturing method of the present invention includes a precursor solution synthesis step, a pH adjustment step, a precursor-colloid dispersion preparation step, a purifying step, and a freeze-drying step.

In the precursor solution synthesis step, a metal-salt aqueous solution is dropped into an alkaline aqueous solution while stirring the alkaline aqueous solution, thereby synthesizing an oxide precursor solution in which an oxide precursor is dispersed. As the metal-salt, indium salt, tin salt, or zinc salt may be used. As the alkaline aqueous solution, a tetramethylammonium hydroxide aqueous solution or an ammonium aqueous solution may be used. By using such metal-salt and alkaline aqueous solution, it is possible to obtain characteristics which enable detecting combustible gas such as carbon monoxide (CO), methane ($CH_4$), or alcohol with high sensitivity.

The pH of the oxide precursor solution thus synthesized is increased because of an excessive amount of alkaline component, which causes a temporal change (a change in particle diameter) and then makes it difficult for the oxide precursor to be precipitated. Thus, in the pH adjustment step, a polar solvent is added to the oxide precursor solution while stirring the oxide precursor solution so as to lower the pH of the oxide precursor solution. As the polar solvent, it is preferable to use a neutral polar solvent (pH 6 to 8) selected from ion-exchanged water, ethanol, and mixture thereof. Such pH adjustment makes it difficult for the temporal change (the change in particle diameter) due to highly alkaline condition to occur, thereby reducing variations in particle diameter of the oxide precursor, which leads to stabilization of gas sensor characteristics. When a polar solvent such as ethanol having lower specific gravity is used for lowering the pH of the oxide precursor solution, it is possible to easily separate the oxide precursor solution into a supernatant containing alkali and a precipitate of the oxide precursor by spontaneous sedimentation.

In the precursor-colloid dispersion preparation step, a noble metal colloid solution in which a noble metal colloid is dispersed is added to the oxide precursor solution whose pH has been adjusted in the pH adjustment step to prepare an oxide precursor noble metal colloid dispersion. More specifically, while stirring the oxide precursor solution, the noble metal colloid solution is added to the oxide precursor solution whose pH has been adjusted, thereby preparing an oxide precursor-noble metal colloid dispersion such that the oxide precursor and the noble metal colloid are dispersed substantially uniformly.

As the noble metal colloid solution, it is preferable to use a platinum colloid solution or a palladium colloid solution in order to obtain appropriate gas sensor characteristics.

When the ion-exchanged water is used as a polar solvent, it is preferable to use a tetramethyl ammonium hydroxide aqueous solution as the alkaline aqueous solution and to use indium salt as the metal-salt (solute in metal-salt aqueous solution) in the precursor solution synthesis step. In this case, the concentration of the tetramethyl ammonium hydroxide aqueous solution is preferably set in a range of 1.46 wt % to 1.59 wt %. It is because when the concentration of the tetramethylammonium hydroxide aqueous solution is lower than 1.46 wt % or higher than 1.59 wt %, the precipitate of the oxide precursor solution is difficult to spontaneously be settled out.

In the purifying step, a polar solvent is added to the oxide precursor-noble metal colloid dispersion prepared in the precursor-colloid dispersion preparation step to purify the oxide precursor-noble metal colloid dispersion, thereby preparing a purified oxide precursor-noble metal colloid dispersion from which impurities have been removed. In the purifying step, the polar solvent is added to the oxide precursor-noble metal colloid dispersion prepared in a vessel while stirring the dispersion and then the vessel is left to stand. Then, the oxide precursor and noble metal colloid are precipitated by spontaneous sedimentation, thereby causing the solution in the vessel to be separated into a supernatant (state where impurities are mixed in the polar solvent and oxide precursor-noble metal colloid dispersion) containing the polar solvent and a precipitate of the oxide precursor-noble metal colloid dispersion. Then, the supernatant is removed, and the polar solvent is further added to the remaining precipitate while stirring, whereby a purified oxide precursor-noble metal colloid dispersion is obtained. The above operation may be performed only once. However, in order to positively remove the impurities, it is preferable to perform the above operation at least twice.

The purified oxide precursor-noble metal colloid dispersion is finally made into a form of a precipitate of the purified oxide precursor-noble metal colloid dispersion and is then subjected to freeze-drying as described later. However, if a polar solvent (e.g., ethanol or mixture containing ethanol) other than the ion-exchanged water is used in the pH adjustment step and purifying step, highly-concentrated ethanol (polar solvent other than the ion-exchanged water) remains in the precipitate of the purified oxide precursor-noble metal colloid dispersion. This ethanol is mixed into lubricant of a freeze-drying machine to place burden on a pump of the freeze-drying machine. In a substitution step further included in the manufacturing method according to the present invention, ion-exchanged water is added to the purified oxide precursor-noble metal colloid dispersion so as to lower the concentration of the polar solvent other than the ion-exchanged water, such as ethanol, in the purified oxide precursor-noble metal colloid dispersion, thereby substituting the ion-exchanged water for the polar solvent other than the ion-exchanged water. With the above operation, the concentration of the polar solvent other than the ion-exchanged water remaining in the precipitate of the purified oxide precursor-noble metal colloid dispersion can be lowered. This prevents the polar solvent other than the ion-exchanged water from being mixed into the lubricant of a freeze-drying machine at the freeze-drying time, thereby preventing the performance of a pump of the freeze-drying machine from being deteriorated.

In the freeze-drying step, the precipitate of the purified oxide precursor-noble metal colloid dispersion is freeze-dried by using a freeze-drying machine. When the polar solvent used is ethanol or mixture containing ethanol, the purified oxide precursor-noble metal colloid dispersion after the substitution step is in a state where the oxide precursor and noble metal colloid are dispersed in ion-exchanged water-ethanol mixture. Since the ion-exchanged water-ethanol mixture is an azeotrope (easy to evaporate), the precipitate of the purified oxide precursor-noble metal colloid dispersion can be easily freeze-dried.

According to the present invention, the precursor-colloid dispersion can be purified without being subjected to forcible centrifugal separation. Further, heating is not necessary for drying the precipitate of the precursor-colloid dispersion. With the above, it is possible to manufacture, by a simple method, a metal oxide semiconductor material for gas sensors having high sensor sensitivity and less varying electrical characteristics.

Particularly, it is possible to make it less frequent for the temporal change due to highly alkaline condition to occur through the pH adjustment step, thereby facilitating the precipitation of the oxide precursor. As a result, the oxide precursor and noble metal colloid can be precipitated by spontaneous sedimentation without being subjected to centrifugal separation which may likely cause cohesion of particles. Particularly, by using ethanol having lower specific gravity than the noble metal colloid or mixture containing ethanol as a polar solvent in the purifying step, it is possible to easily precipitate the oxide precursor and noble metal colloid by spontaneous sedimentation. As a result, the cohesion of particles due to the centrifugal separation does not occur, thereby preventing a variation from occurring in characteristics of the metal oxide semiconductor material for gas sensors.

Further, application of the freeze drying results in uniform distribution of particle diameters in the dried precipitate. In the freeze-drying step, the precipitate picked up from the purified oxide precursor-noble metal colloid dispersion is preferably immersed in liquid nitrogen so as to be frozen. When the freeze-drying is performed by using the liquid nitrogen, the precipitate can rapidly be frozen, thereby preventing the particles from cohering into a fibrous structure due to the growth of ice at the frozen time. Since the ion-exchanged water-ethanol mixture is an azeotrope (easy to evaporate), when the polar solvent is ethanol, it is possible to extract the precipitate in the form of fine particles with a uniform size merely by performing freeze-drying in the freeze-drying step. That is, since a conventional thermal drying which may likely cause cohesion of particles is not performed, it is possible to prevent a variation from occurring in characteristics of the metal oxide semiconductor material for gas sensors.

Since the cohesion does not readily occur at the drying time to eliminate the need to perform pulverization after drying, it is possible to avoid adverse effect of the pulverization on electrical characteristics. Thus, it is possible to spontaneously precipitate platinum colloid which is difficult to be separated as the precipitate by a conventional forcible separation using a centrifuge. Particularly, it is possible to easily precipitate the platinum colloid by spontaneous sedimentation by using ethanol having lower specific gravity than the platinum colloid or mixture containing ethanol as a polar solvent in the purifying step. As a result, according to the present invention, the platinum colloid having a high catalyst activity can be used as the noble metal colloid without performing forcible centrifugal separation. Therefore, the sensing function of gas sensors can be enhanced (for example, sensing sensitivity can be enhanced, or refresh temperature can be decreased).

In the pH adjustment step, the pH of the oxide precursor solution is preferably adjusted in a range of pH 6 to pH 10. If the pH of the oxide precursor solution is adjusted in a range of pH 6 to pH 10, it is possible to achieve uniformity in distribution of particle diameters. If the pH is higher than 10, particles may easily be broken. Since a neutral (pH 6 to 8) polar solvent is used in the present invention, the pH cannot be lower than 6.

In the purifying step, the supernatant containing impurities extracted from the precursor-colloid dispersion by the purifying step can be removed by using a decantation (a method of removing the supernatant by inclining a vessel containing the supernatant and precipitate in a separated manner). Thus, the impurities in the precursor-colloid dispersion can reliably be removed with a simple operation.

BRIEF DESCRIPTION OF THE DRAWINGS

FIG. 3 (A) is an SEM photograph obtained by photographing, using a scanning electron microscope (SEM) at a magnification of 50,000, a state after freeze-drying is performed without using liquid nitrogen at −40° C. with a Pt colloid used as the noble metal colloid, and FIG. 3 (B) is an SEM photograph obtained by photographing, using a scanning electron microscope (SEM) at a magnification of 50,000, a state after liquid nitrogen freeze-drying is performed by using liquid nitrogen with a Pt colloid used as the noble metal colloid.

FIGS. 4 (A) and 4 (B) are graphs each illustrating the relationship between CO concentration (ppm) and resistance value R (kΩ) observed when a metal oxide semiconductor material according to the embodiment of the present invention is used for a gas sensor to measure CO gas.

BEST MODE FOR CARRYING OUT THE INVENTION

Figure 1:
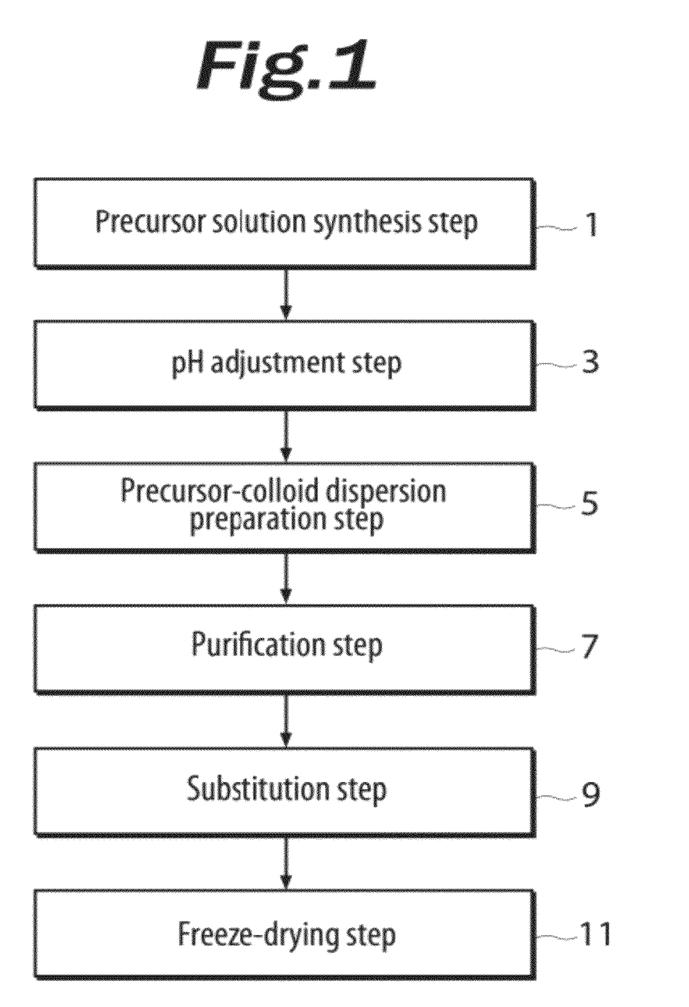
FIG. 1 is a process chart of a manufacturing method of a metal oxide semiconductor material for gas sensors according to an embodiment of the present invention.

An embodiment of a manufacturing method of a metal oxide semiconductor material for gas sensors according to the present invention will be described below. FIG. 1 is a process chart of a manufacturing method (when ethanol is used as a polar solvent) for a metal oxide semiconductor material for gas sensors according to an embodiment of the present invention. The manufacturing method using ethanol as the polar solvent roughly includes a precursor solution synthesis step 1, a pH adjustment step 3, a precursor-colloid dispersion preparation step 5, a purifying step 7, a substitution step 9, and a freeze-drying step 11. Note that a manufacturing method when ion-exchanged water is used as the polar solvent is the same as the manufacturing method using ethanol as the polar solvent except that the substitution step 9 in the process chart is not included.

In the precursor solution synthesis step 1, an alkaline aqueous solution is poured in a vessel, and a metal-salt aqueous solution is dropped into the alkaline aqueous solution while stirring the alkaline aqueous solution, whereby an oxide precursor solution in which an oxide precursor is dispersed is synthesized. In this example, indium salt is used as the metal-salt, and a tetramethylammonium hydroxide (TMAH) aqueous solution is used as the alkaline aqueous solution. By using such metal-salt and alkaline aqueous solution, it is possible to obtain characteristics which enable detecting combustible gas such as carbon monoxide with high sensitivity.

In the pH adjustment step 3, ethanol is added as a polar solvent to the oxide precursor solution so as to lower the pH of the oxide precursor solution. In the present example, ethanol is added to the oxide precursor solution until the pH of the oxide precursor solution reaches 10. More specifically, 99.5 volume % ethanol is added to 90 ml indium hydroxide [In$(OH)_2$] solution (the oxide precursor solution) while stirring the solution to obtain a 500 ml solution. The oxide precursor solution before the pH adjustment has a pH of about 12 because of an excessive amount of alkaline component. This highly alkaline condition causes the temporal change of the oxide precursor to make it difficult for the oxide precursor solution to be precipitated. Thus, when the ethanol is added to the oxide precursor solution to make the pH of the oxide precursor solution be not more than 10 as described above, the temporal change caused by the highly alkaline condition can be prevented, thereby facilitating the precipitation of the oxide precursor solution.

In the precursor-colloid dispersion preparation step 5, noble metal colloid solution in which a noble metal colloid is dispersed is added to the oxide precursor solution whose pH has been adjusted in the pH adjustment step 3 to prepare an oxide precursor-noble metal colloid dispersion in which the oxide precursor and the noble metal colloid are dispersed substantially uniformly. In this example, the oxide precursor solution whose pH has been adjusted in the pH adjustment step 3 is separated by spontaneous sedimentation into a supernatant and a precipitate. Then, the supernatant is removed by a decantation to allow only a 200 ml precipitate to remain in the solution. Then, 55 ml noble metal colloid solution is added to the resultant solution while stirring the resultant solution. In this example, a palladium colloid (Pd colloid) and a platinum colloid (Pt colloid) as described later are used as the noble metal colloid solution.

In the purifying step 7, ethanol is added, as a polar solvent, to the oxide precursor-noble metal colloid dispersion prepared in the precursor-colloid dispersion preparation step 5 to purify the oxide precursor-noble metal colloid dispersion to prepare a purified oxide precursor-noble metal colloid dispersion from which impurities have been removed. In this example, ethanol is added to 255 ml oxide precursor-noble metal colloid dispersion, which has been prepared in the vessel, while stirring the dispersion to obtain 500 ml solution. Then, the vessel is left to stand for spontaneous sedimentation to cause the solution in the vessel to be separated into a precipitate of the oxide precursor-noble metal colloid dispersion and a supernatant (state where impurities are mixed in the solvent of ethanol and precursor-colloid dispersion). After that, the supernatant is removed by a decantation, and ethanol as a polar solvent is further added to the remaining 150 ml precipitate while stirring to obtain 500 ml solution. In this example, these operations are repeated three times. More specifically, in the additional operations to be performed twice, the following steps are performed: adding the ethanol to the remaining 150 ml precipitate to obtain 500 ml solution, leaving the 500 ml solution described above in the vessel to stand for spontaneous sedimentation to cause the solution in the vessel to be separated into a precipitate and a supernatant, removing the supernatant by a decantation, and adding ethanol to the remaining 150 ml precipitate while stirring to obtain 500 ml solution are performed. The 500 ml solution after the three purifying operations constitutes a purified oxide precursor-noble metal colloid dispersion according to the present invention.

Figure 2:
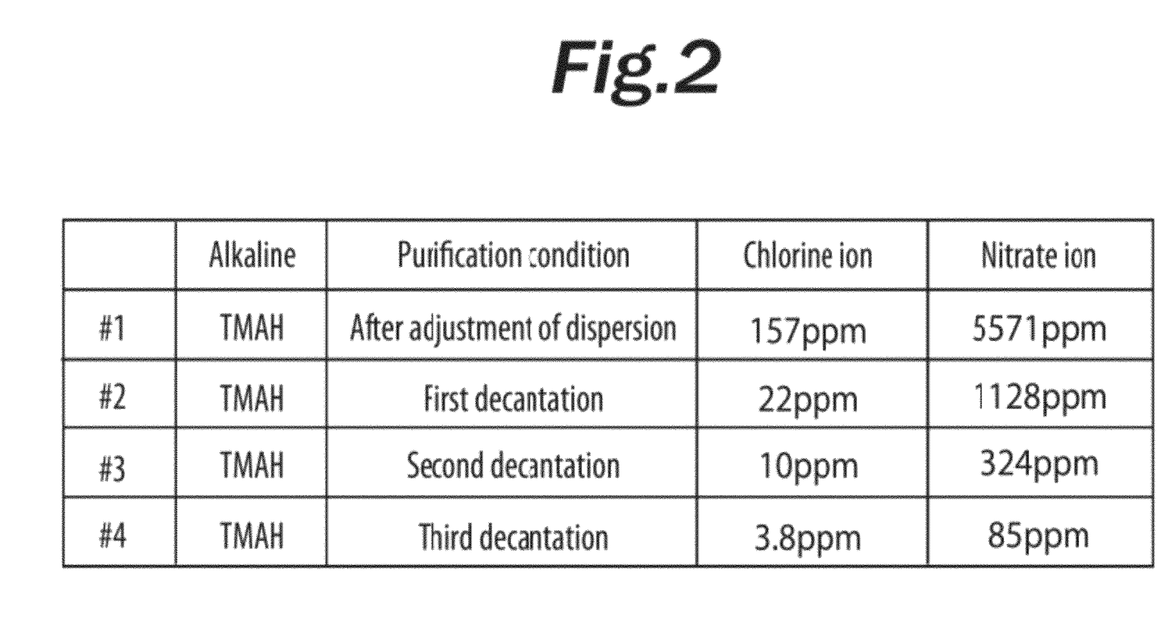
FIG. 2 illustrates the relationship between the number of times of purifying operation and the concentration of impurities.

As is clear from FIG. 2, it can be understood that the concentration of impurities (chlorine ion and nitrate ion) in the supernatant decreases as the number of times of the purifying operation in the purifying step 7 increases. Therefore, performing the purifying operation plurality of times (two or three times) can remove the impurities more reliably than performing a single purifying operation. Although the decantation which is a simple and reliable method is employed in the present example, it goes without saying that the supernatant may be removed by means of a dropper.

In the substitution step 9, the 500 ml purified oxide precursor-noble metal colloid dispersion obtained in the purifying step 7 is separated into a supernatant and a precipitate by spontaneous sedimentation, the supernatant is removed by a decantation, and ion-exchanged water is added to the remaining 250 ml precipitate while stirring to obtain 500 ml solution. With the above operation, an ethanol concentration of approximately 95 volume % or more can be decreased to that of approximately 50 volume %. This 500 ml solution (having an ethanol concentration of about 50 volume %) is separated into a supernatant and a precipitate by spontaneous sedimentation, the supernatant is removed by a decantation, and ion-exchanged water is added to the remaining 250 ml precipitate while stirring to obtain 500 ml solution. At this time point, the ethanol concentration is decreased to about 25 volume %. This 500 ml solution (having an ethanol concentration of about 25 volume %) is separated into a supernatant and a precipitate by spontaneous sedimentation, the supernatant is removed by a decantation, and ion-exchanged water is added to the remaining 100 ml precipitate while stirring to obtain 250 ml solution. With the operations up to this point, the ethanol is substituted with the ion-exchanged water. Finally, the ethanol concentration is decreased to about 10 volume %. This 500 ml solution (having an ethanol concentration of about 10 volume %) is separated into a supernatant and a precipitate by spontaneous sedimentation, the supernatant is removed by a decantation, and the 100 ml precipitate remaining after the removal of the supernatant by using the decantation is subjected to freeze-drying in the freeze-drying step 11 as described later. When the ethanol concentration in the purified oxide precursor-noble metal colloid dispersion is decreased to about 10 volume % as mentioned above, it is possible to prevent a pump of a drying machine from being clogged with the ethanol during the freeze-drying. Although the ethanol concentration in the purified oxide precursor-noble metal colloid dispersion is decreased to about 10 volume % in this example, the ethanol concentration is not limited to this, but may be decreased as much as possible as long as the performance of the pump of a freeze-drying machine is not deteriorated.

Figure 3A:
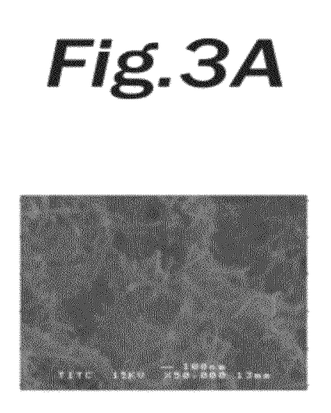
Figure 3B:
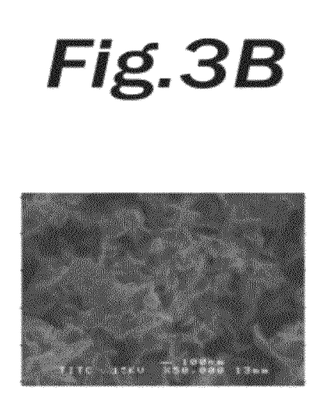

In the freeze-drying step 11, the 100 ml precipitate of the purified oxide precursor-noble metal colloid dispersion after substitution of the ethanol with ion-exchanged water in the substitution step 9 is freeze-dried using a freeze-drying machine. The purified oxide precursor-noble metal colloid dispersion after the substitution step 9 is in a state where the oxide precursor and noble metal colloid are dispersed in the ion-exchanged water-ethanol mixture. Since the ion-exchanged water-ethanol mixture is an azeotrope (easy to evaporate), the precipitate of the purified oxide precursor-noble metal colloid dispersion can be freeze-dried in a short time. In this example, the precipitate picked up from the purified oxide precursor-noble metal colloid dispersion is immersed in liquid nitrogen so as to be frozen for freeze-drying. FIG. 3 (A) is an SEM photograph obtained by photographing, using a scanning electron microscope (SEM) at a magnification of 50,000, a state after freeze-drying (without use of liquid nitrogen) is performed at −40° C. with a Pt colloid used as the noble metal colloid. FIG. 3 (B) is an SEM photograph obtained by photographing, using a scanning electron microscope (SEM) at a magnification of 50,000, a state after liquid nitrogen freeze-drying is performed using liquid nitrogen with a Pt colloid used as the noble metal colloid. In FIG. 3 (A) in which the freeze-drying is performed without use of the liquid nitrogen, particles cohere into a fibrous structure (or cohere in a string), resulting in non-uniform distribution of particle diameters. In FIG. 3 (B) in which the freeze-drying is performed by using the liquid nitrogen, particles are in a powdery state (do not cohere into a fibrous structure), resulting in uniform distribution of particle diameters. Thus, when the freeze-drying is performed by using the liquid nitrogen, the precipitate can rapidly be frozen, thereby preventing the particles from cohering into a fibrous structure due to the growth of ice at the frozen time as illustrated in FIG. 3.

Effects of the present invention will be described with the metal oxide semiconductor material (Examples 1 and 2) according to the present embodiment prepared under the conditions described above used for gas sensors. Conditions of Examples 1 and 2 are as follows. In Comparative Example 1, a metal oxide semiconductor material manufactured according to a conventional manufacturing method is used for gas sensors.

Example 1

(1) Oxide precursor
Alkaline aqueous solution
  1.5 wt % tetramethylammonium hydroxide aqueous solution: 60 ml
Metal-salt aqueous solution
  Indium nitrate: 1.28 g
  Ion-exchanged water: 30 ml
(2) Noble metal colloid
Pd colloid (palladium colloid)
(3) Purifying liquid
Ethanol
(4) Separation of precipitate
Separation by spontaneous sedimentation
(5) Drying
Freeze-drying by using liquid nitrogen Example 2

(1) Oxide precursor
Alkaline aqueous solution
  1.5 wt % tetramethylammonium hydroxide aqueous solution: 60 ml
Metal-salt aqueous solution
  Indium nitrate: 1.28 g
  Ion-exchanged water: 30 ml
(2) Noble metal colloid
Pt colloid (platinum colloid)
(3) Purifying liquid
Ethanol
(4) Separation of precipitate
Separation by spontaneous sedimentation
(5) Drying
Freeze-drying by using liquid nitrogen Comparative Example 1

Figure 4A:
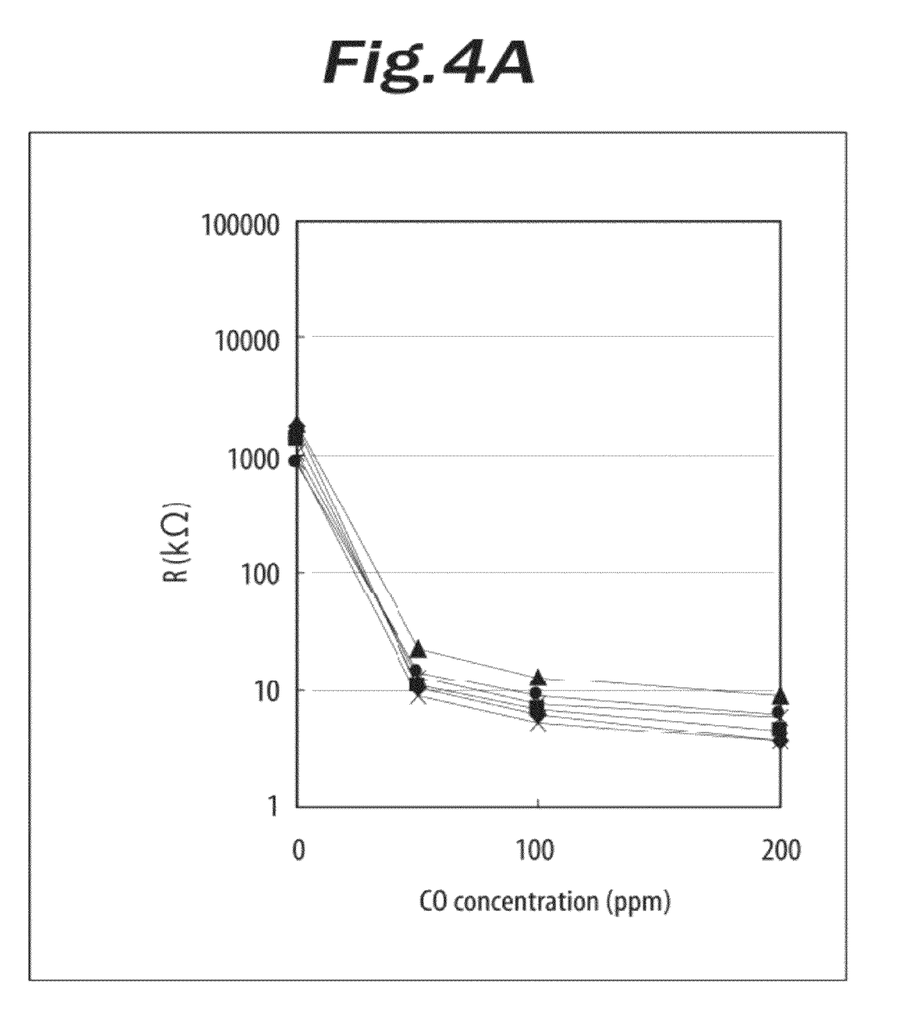
Figure 4B:
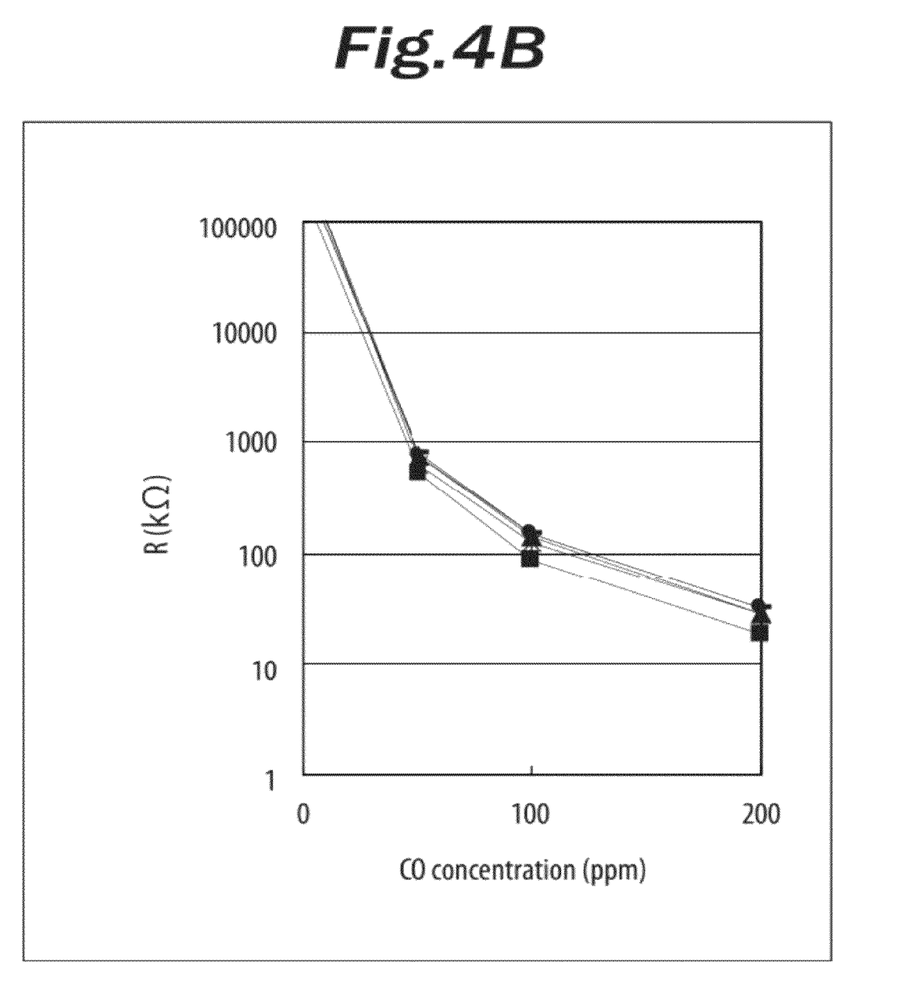

(1) Oxide precursor
Alkaline aqueous solution
   3 wt % tetramethylammonium hydroxide aqueous solution: 60 ml
   Tetrapropylammonium bromide: 0.959 g
Metal-salt aqueous solution
   Indium nitrate: 1.28 g
   Stannous acetate: 0.0078 g
   Cobalt acetate: 0.00737 g
   Ion-exchanged water: 30 ml
(2) Noble metal colloid
Pd colloid (palladium colloid)
(3) Purifying liquid
Ion-exchanged water
(4) Separation into supernatant and precipitate
Forcible separation by using centrifuge
(5) Drying
200° C., three hours FIGS. 4 (A) and 4 (B) are graphs illustrating the relationship between CO concentration (ppm) and resistance value R (kΩ) observed when the metal oxide semiconductor materials of Examples 1 and 2 are used for gas sensors to measure CO gas. A plurality of samples are used for confirmation of reproducibility in the Examples 1 and 2.

Each of the graphs of FIGS. 4 (A) and 4 (B) represents that the larger the inclination of the lines in the graph in a range from 50 ppm to 200 ppm of the CO concentration (ppm), the higher the CO gas detection sensitivity becomes. As illustrated in FIGS. 4 (A) and 4 (B), the inclination of the lines in the graph in a range from 50 ppm to 200 ppm is plus both in Example 1 (wherein pd colloid is used) and Example (wherein Pt colloid is used), which means that the CO gas detection function is effected. Although not illustrated, the graph of Comparative example 1 represents substantially the same behaviors or the same tendency of change as the graph of Example 1 (wherein Pd colloid is used).

Further, as is known from FIGS. 4 (A) and 4 (B), the inclination of the lines in the graph of Example 2 (wherein Pt colloid is used) is larger than that of the lines in the graph of Example 1 (wherein Pd colloid is used), which means that the CO gas detection sensitivity is higher when Pt colloid is used as the noble metal colloid than when Pd colloid is used.

Figure 5:
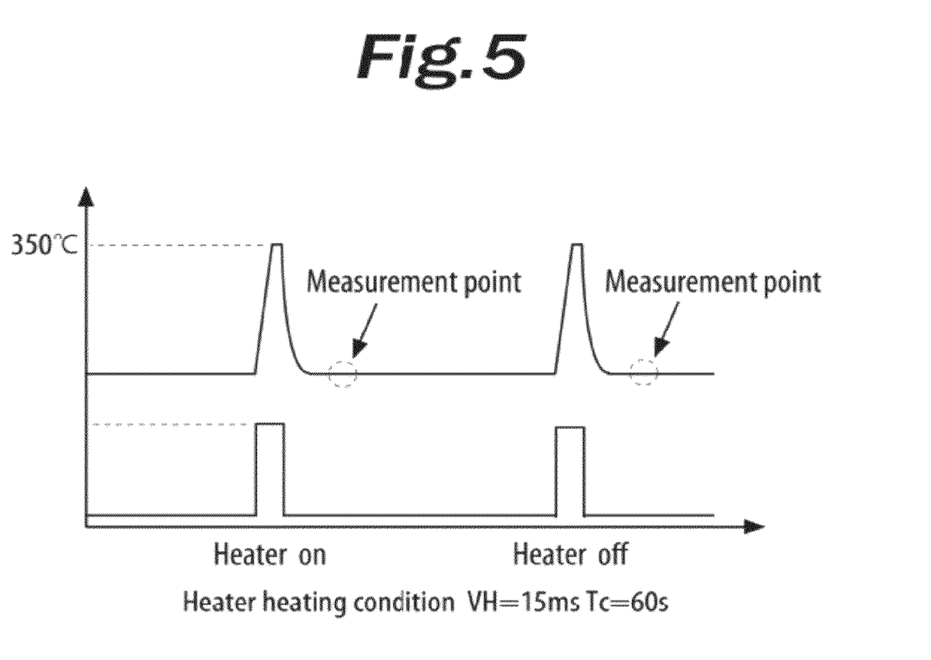
FIG. 5 is a graph illustrating a heater heating condition when the metal oxide semiconductor material according to the embodiment of the present invention is used for a gas sensor.

FIG. 5 is a graph illustrating a heater heating condition when the metal oxide semiconductor material of Example 2 is used for gas sensors. In Example 1 (wherein Pd colloid is used) and Comparative Example 1 (wherein Pd colloid is used) which are not illustrated, the gas sensor is generally refreshed at a temperature of about 400 to 450° C., while in Example 2 (wherein Pt colloid is used) illustrated in FIG. 5, the gas sensor is refreshed at a heating temperature of 350° C. Thus, the gas sensor can be refreshed at a lower temperature when the metal oxide semiconductor material using the Pt colloid is used for gas sensors than when the metal oxide semiconductor material using the Pd colloid is used for gas sensors.

As described above, according to the manufacturing method of the present embodiment, the precursor-colloid dispersion can be purified without being subjected to forcible centrifugal separation in the purifying step 7 after the pH of the oxide precursor solution is adjusted in the pH adjustment step 3. Further, heating is not necessary for drying the precipitate of the precursor-colloid dispersion in the freeze-drying step 11. With the above, it is possible to manufacture, by a simple method, a metal oxide semiconductor material for gas sensors having high sensor sensitivity and less varying electrical characteristics. That is, by using ethanol having lower specific gravity than the noble metal colloid as a polar solvent, it is possible to precipitate the noble metal colloid without performing centrifugal separation which may likely cause cohesion of particles. As a result, the cohesion of particles due to the centrifugal separation at the purifying time does not occur, thereby preventing a variation from occurring in characteristics of the metal oxide semiconductor material for gas sensors. Further, the ion-exchanged water-ethanol mixture is an azeotrope (easy to evaporate), so that only by applying short time freeze-drying to the precipitate of the purified oxide precursor-noble metal colloid dispersion after substitution of the ion-exchanged water for the ethanol, it is possible to extract the precipitate in the form of fine particles with a uniform size. That is, since a conventional thermal drying which may easily cause cohesion of particles is not performed, it is possible to prevent a variation from occurring in characteristics of the metal oxide semiconductor material for gas sensors. Since the particles do not readily cohere at the drying time to eliminate the need to perform pulverization after calcination, it is possible to avoid adverse effect of the pulverization on electrical characteristics. Further, the application of the freeze drying results in uniform distribution of particle diameters in the dried precipitate.

The effects (easy spontaneous sedimentation, uniform distribution of particle diameters of precipitate, etc.) in Examples 1 and 2 can be obtained not only when ethanol is used as a polar solvent as in the Examples 1 and 2, but also when ion-exchanged water is used as a polar solvent as in the following Examples 3 to 5. Comparative Examples 2 and 3 examples are intended to confirm the limits of the range within which the abovementioned effects, such as easy spontaneous sedimentation, can be obtained when ion-exchanged water is used as a polar solvent (Examples 3 to 5).

Example 3

(1) Oxide precursor
Alkaline aqueous solution
   1.5 wt % tetramethylammonium hydroxide aqueous solution: 60 ml
Metal-salt aqueous solution
   Indium nitrate: 1.28 g
   Ion-exchanged water: 30 ml
(2) Noble metal colloid
Pt colloid
(3) Purifying liquid
Ion-exchanged water
(4) Separation of precipitate
Separation by spontaneous sedimentation
(5) Drying
Freeze-drying by using liquid nitrogen Example 4

(1) Oxide precursor
Alkaline aqueous solution
   1.583 wt % tetramethylammonium hydroxide aqueous solution: 60 ml
Metal-salt aqueous solution
   Indium nitrate: 1.28 g
   Ion-exchanged water: 30 ml
(2) Noble metal colloid
Pt colloid
(3) Purifying liquid
Ion-exchanged water
(4) Separation of precipitate
Separation by spontaneous precipitation
(5) Drying
Freeze-drying by liquid nitrogen Example 5

(1) Oxide precursor
Alkaline aqueous solution
    1.452 wt % tetramethylammonium hydroxide aqueous solution: 60 ml
Metal-salt aqueous solution
    Indium nitrate: 1.28 g
    Ion-exchanged water: 30 ml
(2) Noble metal colloid
Pt colloid
(3) Purifying liquid
Ion-exchanged water
(4) Separation of precipitate
Separation by spontaneous sedimentation
(5) Drying
Freeze-drying by using liquid nitrogen Comparative Example 2

(1) Oxide precursor
Alkaline aqueous solution
    1.4 wt % tetramethylammonium hydroxide aqueous solution: 60 ml
Metal-salt aqueous solution
    Indium nitrate: 1.28 g
    Ion-exchanged water: 30 ml
(2) Noble metal colloid
Pt colloid (platinum colloid)
(3) Purifying liquid
Ion-exchanged water
(4) Separation of precipitate
Separation by spontaneous sedimentation
(5) Drying
Freeze-drying by using liquid nitrogen Comparative Example 3

(1) Oxide precursor
Alkaline aqueous solution
    1.6 wt % tetramethylammonium hydroxide aqueous solution: 60 ml
Metal-salt aqueous solution
    Indium nitrate: 1.28 g
    Ion-exchanged water: 30 ml
(2) Noble metal colloid
Pt colloid (platinum colloid)
(3) Purifying liquid
Ion-exchanged water
(4) Separation of precipitate
Separation by spontaneous sedimentation
(5) Drying
Freeze-drying by using liquid nitrogen Although not illustrated, according to Examples 3 to 5, it is possible to obtain the same sensor characteristics and abovementioned effects, such as easy spontaneous sedimentation, as those (refer to FIGS. 2 to 5) obtained in Examples 1 and 2. That is, it can be seen from Examples 3 to 5 and Comparative Examples 2 and 3 that even when ion-exchanged water is used as a polar solvent, it is possible to obtain the same sensor characteristics and abovementioned effects, such as easy spontaneous sedimentation, as when ethanol is used as a polar solvent, as long as the concentration of tetramethylammonium hydroxide aqueous solution used as an alkaline aqueous solution falls within a range of 1.452 wt % to 1.583 wt %.

In the present embodiment, in the precursor solution synthesis step 1, since the oxide precursor solution is synthesized by adding an indium nitrate aqueous solution to a tetramethylammonium hydroxide aqueous solution, the obtained an oxide precursor is indium hydroxide. Thus, the zeta potential and average particle diameter of the oxide precursor (indium hydroxide) prepared in Example 2 were measured. The zeta potential was measured by using a zeta potential analyzer [Nanotrac UPA-UZ152] made by Nikkiso Co., Ltd. The average particle diameter was obtained by assigning a value measured by using an x-ray diffractometer (Discover D8 with GADDS) made by Bruker AXS to the Scherrer Equation. As a result, the zeta potential of the oxide precursor (indium hydroxide) prepared in Example 2 was −20 mV. The average particle diameter of the oxide precursor (indium hydroxide) was 39.4 µm. The optimal range of the zeta potential and that of the average particle diameter of the oxide precursor (indium hydroxide) for the effects (easy spontaneous sedimentation, uniform distribution of particle diameters of precipitate, favorable sensor characteristics, etc.) of the present invention have not yet been identified. However, it is conceivable that the properties of the oxide precursor (indium hydroxide), such as the zeta potential and average particle diameter, have some kind of influence on the spontaneous sedimentability, uniformity in distribution of precipitate particle diameters, and sensor characteristics of the metal oxide semiconductor material for gas sensors.

According to the present invention, oxide precursor-noble metal colloid dispersion prepared by adding noble metal colloid solution to an oxide precursor solution whose pH has been adjusted is purified with a polar solvent so as to remove the impurities in the oxide precursor-noble metal colloid dispersion, and a precipitate of the resultant purified oxide precursor-noble metal colloid dispersion is then subjected to freeze-drying. Thus, the oxide precursor-noble metal colloid dispersion can be purified without being subjected to forcible centrifugal separation and, further, the precipitate of the precursor-colloid dispersion can be dried without being heated. As a result, it is possible to achieve uniformity in distribution of particle diameters. Thus, a metal oxide semiconductor material for gas sensors having high sensor sensitivity and less varying electrical characteristics can be manufactured by a simple method.

The invention claimed is:

1. A manufacturing method of a metal oxide semiconductor material for gas sensors wherein a change in resistance of the metal oxide semiconductor material is caused by gas absorption, the method comprising:
    a precursor solution synthesis step of synthesizing an oxide precursor solution in which an oxide precursor is dispersed by dropping a metal-salt aqueous solution into an alkaline aqueous solution while stirring the alkaline aqueous solution;
    a pH adjustment step of adjusting the pH of the oxide precursor solution by adding a polar solvent to the oxide precursor solution so as to lower the pH of the oxide precursor solution;
    a precursor-colloid dispersion preparation step of preparing an oxide precursor-noble metal colloid dispersion in which the oxide precursor and a noble metal colloid are dispersed substantially uniformly by adding a noble metal colloid solution in which the noble metal colloid is dispersed to the oxide precursor solution whose pH has been adjusted;
    a purifying step of purifying the oxide precursor-noble metal colloid dispersion with a polar solvent added thereto to prepare a purified oxide precursor-noble metal colloid dispersion from which impurities have been removed; and a freeze-drying step of freeze-drying a precipitate of the purified oxide precursor-noble metal colloid dispersion.

2. The manufacturing method according to claim 1, wherein
the polar solvent is ion-exchanged water, ethanol, or mixture thereof.

3. The manufacturing method according to claim 2, wherein
when the polar solvent is ethanol or the mixture of the ion-exchanged water and ethanol, the method further comprises a substitution step of substituting the ethanol with ion-exchanged water by adding the ion-exchanged water to the purified oxide precursor-noble metal colloid dispersion so as to lower the concentration of the ethanol in the purified oxide precursor-noble metal colloid dispersion, the substitution step being performed after the purifying step and before the freeze-drying step.

4. The manufacturing method according to claim 1, wherein the noble metal colloid is a platinum colloid or a palladium colloid.

5. The manufacturing method according to claim 4, wherein
in the pH adjustment step, the pH of the oxide precursor solution is adjusted in a range of pH 6 to pH 10.

6. The manufacturing method according to claim 4, wherein
in the purifying step,
the oxide precursor-noble metal colloid dispersion added with the polar solvent is separated, by spontaneous sedimentation, into a supernatant containing impurities and a precipitate of the oxide precursor-noble metal colloid dispersion;
the supernatant is removed; and
a polar solvent is further added to the precipitate remaining after the removal of the supernatant to prepare the purified oxide precursor-noble metal colloid dispersion.

7. The manufacturing method according to claim 4, wherein
in the purifying step,
the oxide precursor-noble metal colloid dispersion added with the polar solvent is separated, by spontaneous sedimentation, into a supernatant containing impurities and a precipitate of the oxide precursor-noble metal colloid dispersion;
the supernatant is removed, the removal of the supernatant containing the impurities being performed by a decantation; and
a polar solvent is further added to the precipitate remaining after the removal of the supernatant to prepare the purified oxide precursor-noble metal colloid dispersion.

8. The manufacturing method according to claim 4, wherein
in the purifying step,
the oxide precursor-noble metal colloid dispersion added with the polar solvent is separated, by spontaneous sedimentation, into a supernatant containing impurities and a precipitate of the oxide precursor-noble metal colloid dispersion;
the supernatant is removed;
a polar solvent is further added to the precipitate remaining after the removal of the supernatant to prepare the purified oxide precursor-noble metal colloid dispersion; and
the separation of the oxide precursor-noble metal colloid dispersion into the supernatant and the precipitate, the removal of the supernatant, and the further addition of the polar solvent to the precipitate remaining after the removal of the supernatant are repeated at least twice.

9. The manufacturing method according to claim 4, wherein
in the freeze-drying step, a precipitate of the purified oxide precursor-noble metal colloid dispersion, which is obtained by separating, by spontaneous sedimentation, the purified oxide precursor-noble metal colloid dispersion into a supernatant and the precipitate of the purified oxide precursor-noble metal colloid dispersion, is subjected to freeze-drying.

10. The manufacturing method according to claim 4, wherein
the metal-salt is indium salt.

11. The manufacturing method according to claim 4, wherein
the alkaline aqueous solution is a tetramethylammonium hydroxide aqueous solution.

12. The manufacturing method according to claim 4, wherein
the metal-salt is indium salt; and
the alkaline aqueous solution is a tetramethylammonium hydroxide aqueous solution.

13. The manufacturing method according to claim 4, wherein
the metal-salt is indium salt;
the alkaline aqueous solution is a tetramethylammonium hydroxide aqueous solution; and
the concentration of the tetramethylammonium hydroxide aqueous solution is in a range of 1.45 wt % to 1.59 wt %.

14. The manufacturing method according to claim 1, wherein in the pH adjustment step, the pH of the oxide precursor solution is adjusted in a range of pH 6 to pH 10.

15. The manufacturing method according to claim 1, wherein
in the purifying step,
the oxide precursor-noble metal colloid dispersion added with the polar solvent is separated, by spontaneous sedimentation, into a supernatant containing impurities and a precipitate of the oxide precursor-noble metal colloid dispersion;
the supernatant is removed; and
a polar solvent is further added to the precipitate remaining after the removal of the supernatant to prepare the purified oxide precursor-noble metal colloid dispersion.

16. The manufacturing method according to claim 1, wherein
in the purifying step,
the oxide precursor-noble metal colloid dispersion added with the polar solvent is separated, by spontaneous sedimentation, into a supernatant containing impurities and a precipitate of the oxide precursor-noble metal colloid dispersion;
the supernatant is removed, the removal of the supernatant containing the impurities being performed by a decantation; and
a polar solvent is further added to the precipitate remaining after the removal of the supernatant to prepare the purified oxide precursor-noble metal colloid dispersion.

17. The manufacturing method according to claim 1, wherein
in the purifying step,
the oxide precursor-noble metal colloid dispersion added with the polar solvent is separated, by spontaneous sedimentation, into a supernatant containing impurities and a precipitate of the oxide precursor-noble metal colloid dispersion;

the supernatant is removed;

a polar solvent is further added to the precipitate remaining after the removal of the supernatant to prepare the purified oxide precursor-noble metal colloid dispersion; and the separation of the oxide precursor-noble metal colloid dispersion into the supernatant and the precipitate, the removal of the supernatant, and the further addition of the polar solvent to the precipitate remaining after the removal of the supernatant are repeated at least twice.

18. The manufacturing method according to claim 1, or wherein in the freeze-drying step, a precipitate of the purified oxide precursor-noble metal colloid dispersion, which is obtained by separating, by spontaneous sedimentation, the purified oxide precursor-noble metal colloid dispersion into a supernatant and the precipitate of the purified oxide precursor-noble metal colloid dispersion, is subjected to freeze-drying.

19. The manufacturing method according to claim 1, wherein
the metal-salt is indium salt.

20. The manufacturing method according to claim 1, wherein
the alkaline aqueous solution is a tetramethylammonium hydroxide aqueous solution.

21. The manufacturing method according to claim 1, wherein
the metal-salt is indium salt; and
the alkaline aqueous solution is a tetramethylammonium hydroxide aqueous solution.

22. The manufacturing method according to claim 1, wherein
the metal-salt is indium salt;
the alkaline aqueous solution is a tetramethylammonium hydroxide aqueous solution; and
the concentration of the tetramethylammonium hydroxide aqueous solution is in a range of 1.45 wt % to 1.59 wt %.

* * * * *